(12) United States Patent
Van De Kieft et al.

(10) Patent No.: US 11,324,649 B2
(45) Date of Patent: May 10, 2022

(54) MOBILITY SCOOTER WITH EASY ACCESS

(71) Applicant: SCOOZY B.V., Delft (NL)

(72) Inventors: Job Van De Kieft, Delft (NL); Jan Willem Van Gent, Delft (NL)

(73) Assignee: SCOOZY B.V., Delft (NL)

( * ) Notice: Subject to any disclaimer, the term of this patent is extended or adjusted under 35 U.S.C. 154(b) by 452 days.

(21) Appl. No.: 16/492,932

(22) PCT Filed: Mar. 12, 2018

(86) PCT No.: PCT/NL2018/050151
§ 371 (c)(1),
(2) Date: Sep. 10, 2019

(87) PCT Pub. No.: WO2018/169390
PCT Pub. Date: Sep. 20, 2018

(65) Prior Publication Data
US 2020/0016015 A1    Jan. 16, 2020

(30) Foreign Application Priority Data

Mar. 13, 2017  (NL) .................................... 2018509

(51) Int. Cl.
*A61G 5/00* (2006.01)
*A61G 5/10* (2006.01)
(Continued)

(52) U.S. Cl.
CPC ............ *A61G 5/1051* (2016.11); *A61G 5/046* (2013.01); *A61G 5/1072* (2013.01); *A61G 5/125* (2016.11); *A61G 2203/14* (2013.01)

(58) Field of Classification Search
CPC ...... A61G 5/1051; A61G 5/125; A61G 5/046; A61G 5/1072; A61G 2203/14; A61G 5/042; A61G 5/00; Y10S 180/907
(Continued)

(56) References Cited

U.S. PATENT DOCUMENTS

| 5,322,140 | A  | * | 6/1994 | Bussinger | ................ | A61G 5/04 |
|           |    |   |        |           |                  | 180/402   |
| 7,866,428 | B1 | * | 1/2011 | Oliver    | ...................... | B60N 2/14 |
|           |    |   |        |           |                  | 180/208   |

(Continued)

FOREIGN PATENT DOCUMENTS

GB          1149505 A       4/1969

OTHER PUBLICATIONS

International Search Report and Written Opinion for Application No. PCT/NL2018/050151, dated May 18, 2018.

*Primary Examiner* — James A Shriver, II
*Assistant Examiner* — Hilary L Johns
(74) *Attorney, Agent, or Firm* — Marshall, Gerstein & Borun LLP

(57) ABSTRACT

The invention relates to a mobility scooter for individual mobility of a person, comprising a chassis, two front wheels aside the chassis and at least one rear wheel, a seat with a seat base and armrests for the person, a footrest on the chassis that extends between the seat and the front wheels, and an electronic controller assembly, wherein the mobility scooter has a driving mode and a boarding mode, wherein in the driving mode the seat base and the armrests are in the driving position, and wherein in the boarding mode the seat base or at least one of the armrests is in the boarding position, wherein the electronic controller is configured to steer the front wheels in the boarding mode into the sideward steering direction that is opposite to the side to which the seat base or the armrest is swung in the boarding position.

10 Claims, 3 Drawing Sheets

(51) Int. Cl.
*A61G 5/12* (2006.01)
*A61G 5/04* (2013.01)
(58) Field of Classification Search
USPC .......................................................... 180/214
See application file for complete search history.

(56) References Cited

U.S. PATENT DOCUMENTS

2003/0019684 A1* 1/2003 Wucherpfennig ............................
A63B 71/0009
180/330
2008/0190682 A1* 8/2008 Mahy .................. B60B 35/1072
180/209

* cited by examiner

MOBILITY SCOOTER WITH EASY ACCESS

BACKGROUND

The invention relates to a mobility scooter for individual mobility of a person.

Mobility scooters are used for many purposes, varying from comfortably travelling longer walking distances to necessary mobility of disabled drivers. Many drivers are able to step in or out their mobility scooter themselves. However, this may be slightly uncomfortable, for example when the driver has to lift his feet over the front wheels of the mobility scooter.

It is an object of the present invention to provide a mobility scooter with easy access.

SUMMARY OF THE INVENTION

The invention provides a mobility scooter for individual mobility of a person, comprising a chassis, two front wheels aside the chassis and at least one rear wheel that are rotatable connected with the chassis and of which at least the front wheels are steered with respect to the chassis by means of a powered front steering mechanism, a seat for the person on the chassis, and a footrest on the chassis that extends in the forward driving direction between the seat and the front wheels, wherein the seat comprises a seat base, a backrest and two armrests, wherein at least one of the armrests is hingeable with respect to the backrest to swing between a driving position and an outspread boarding position, or wherein the seat base is rotatable with respect to the chassis around a vertical axis to swing between a forward driving position and an oblique boarding position, wherein the mobility scooter comprises an electronic controller assembly that is configured to drive the rotation of the wheels and to power at least the front steering mechanism, wherein the mobility scooter has a driving mode and a boarding mode, wherein in the driving mode the seat base and the armrests are in the driving position, and wherein in the boarding mode the seat base or at least one of the armrests is in the boarding position, wherein the electronic controller assembly is configured to steer the front wheels in the boarding mode into the sideward steering direction that is opposite to the side to which the seat base or the armrest is swung in the boarding position.

Alternatively formulated, the invention provides a mobility scooter for individual mobility of a person, comprising a chassis, two front wheels aside the chassis and at least one rear wheel that are rotatable connected with the chassis and of which at least the front wheels are steered with respect to the chassis by means of a powered front steering mechanism, a seat for the person on the chassis, and a footrest on the chassis that extends in the forward driving direction between the seat and the front wheels, wherein the seat comprises a seat base, a backrest and two armrests, wherein at least one of the group of the at least one of the armrests and the seat base has a driving position and a boarding position, wherein the at least one of the armrests is hingeable with respect to the backrest to swing between an arm supporting position in its driving position and an outspread position in its boarding position, and wherein the seat base is rotatable with respect to the chassis around a vertical axis to swing between a forward position in its driving position and an oblique position in its boarding position, wherein the mobility scooter comprises an electronic controller assembly that is configured to drive the rotation of the wheels and to power at least the front steering mechanism, wherein the mobility scooter has a driving mode and a boarding mode, wherein in the driving mode the seat base and the armrests are in their driving position, and wherein in the boarding mode at least one of the group of the seat base and the at least one of the armrests is in its boarding position, wherein the electronic controller assembly is configured to steer the front wheels in the boarding mode into the sideward steering direction that is opposite to the side to which the seat base or the armrest is swung in its boarding position.

The mobility scooter according to the invention has a driving mode and a boarding mode, wherein in the boarding mode the front wheels are steered into the sideward steering direction that is opposite to the side to which the seat base or the armrest is swung in the boarding position. By steering the front wheels away from the side where the person steps in or out, the parts of the adjacent wheel that are close to the footrest move away from it, whereby more clearance or space is generated for the person to swing his feet along the footrest from or onto the ground. This makes it easy to step in or out of the mobility scooter.

In a first embodiment the mobility scooter comprises a first position sensor to register the boarding position of the armrest, wherein the first position sensor is connected with the electronic controller assembly and wherein the electronic controller assembly is configured to steer the front wheels into the sideward steering direction that is opposite to the side to which the armrest is swung in response to the registration of the movement of the armrest towards its boarding position.

In a second embodiment the mobility scooter comprises a second position sensor to register the boarding position of the seat base, wherein the second position sensor is connected with the electronic controller assembly and wherein the electronic controller assembly is configured to steer the front wheels into the sideward steering direction that is opposite to the side to which the seat base is swung in response to the registration of the movement of the seat base towards its boarding position.

The first embodiment and the second embodiment may be combined.

In an embodiment the mobility scooter comprises two rear wheels aside the chassis, wherein the rear wheels are steered with respect to the chassis by means of a powered rear steering mechanism, wherein the electronic controller assembly is configured to drive both the front steering mechanism and the rear steering mechanism, and wherein the electronic controller assembly is configured to steer the front wheels and the rear wheels in the boarding mode into the sideward steering direction that is opposite to the side to which the seat base or the armrest is in the boarding position. In this embodiment both the front wheels and the rear wheels steer away from the side where the person steps in or out, whereby the parts of both the front wheel and the rear wheel that are close to the footrest at the side where the person steps in or out, move away from it. This generates more space on the ground near the footrest.

In an embodiment the front wheels overlap in the forward driving direction at least partly with the footrest. Alternatively defined, in a horizontal projection perpendicular to the forward driving direction, the front wheels at least partly overlap with the footrest.

In an embodiment thereof the chassis comprises a recess at the overlap to receive a part of one of the front wheel when it is in its sideward steering position. The recess allows a further oblique position of the steered wheel with respect to the chassis, whereby the mobility scooter can make sharp turns.

In an embodiment the electronic controller assembly is configured to steer the wheels in the boarding mode into the outermost sideward steering position to provide maximum clearance or space for the person to swing his feet along the footrest from or onto the ground.

In a compact embodiment the mobility scooter comprises an electric wheel hub motor in at least one of the wheels.

In an fully electrically powered embodiment the mobility scooter comprises batteries for electric powering the driving of the mobility scooter.

In an embodiment the mobility scooter comprises a manually operated controller, such as a joystick, for manually driving the mobility scooter by the person, wherein the manually operated controller is connected with the electronic controller assembly, and wherein the electronic controller assembly is configured to power the front steering mechanism in response to the manipulations of the manually operated controller.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1A:
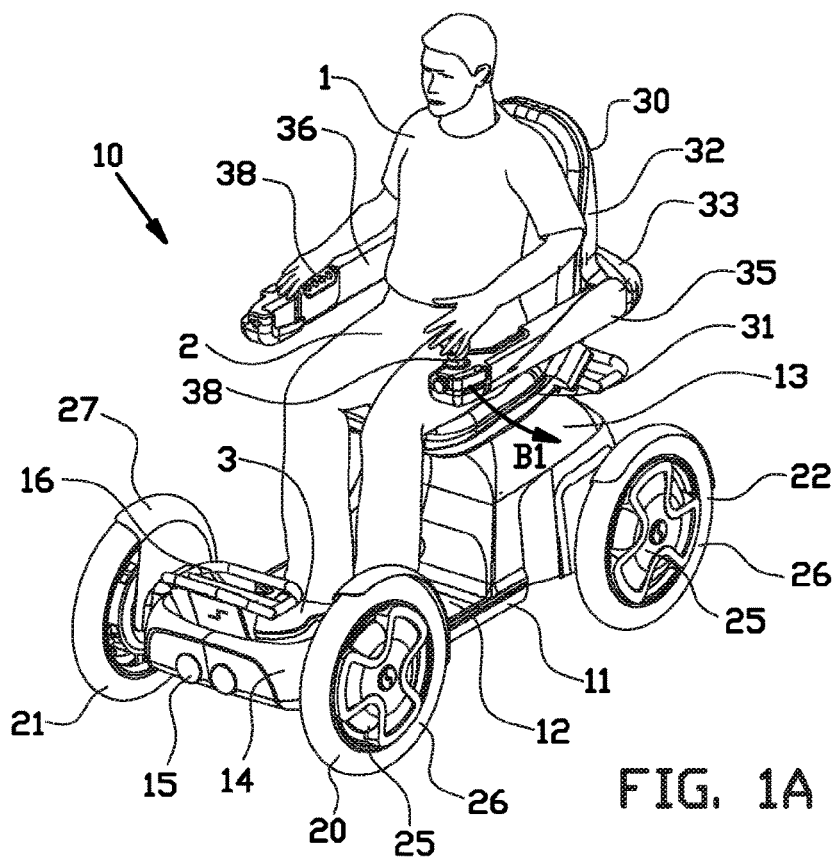
FIGS. 1A and 1B show a mobility scooter according to an embodiment of the invention, in its driving mode.
Figure 1B:
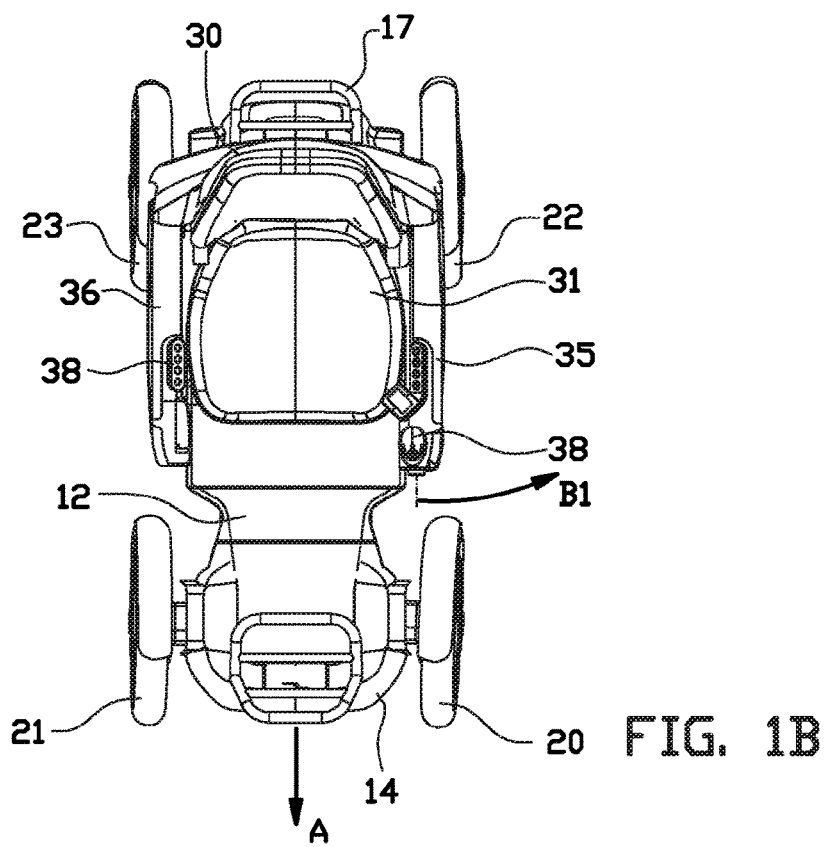

FIGS. 1A and 1B show a comfort scooter or mobility scooter 10 for individual mobility of one person 1. The mobility scooter 10 is in this example electrically powered from batteries for driving in its forward driving direction A, and may be used for many different purposes, varying from comfortably travelling longer walking distances for any driver to the necessary mobility of disabled drivers, wherein in the latter the mobility scooter 10 may be personalized to the individual abilities of the person 1.

The mobility scooter 10 comprises an undercarriage or chassis 11 having a footrest 12 for the feet 3 of the person 1, a raised battery housing 13 at the back side and a raised steering housing 14 at the front side. The mobility scooter 10 is in this example provided with a front lights 15, a front luggage rack 16 above the steering housing 14, and a back luggage rack 17 behind the battery housing 13.

Figure 2A:
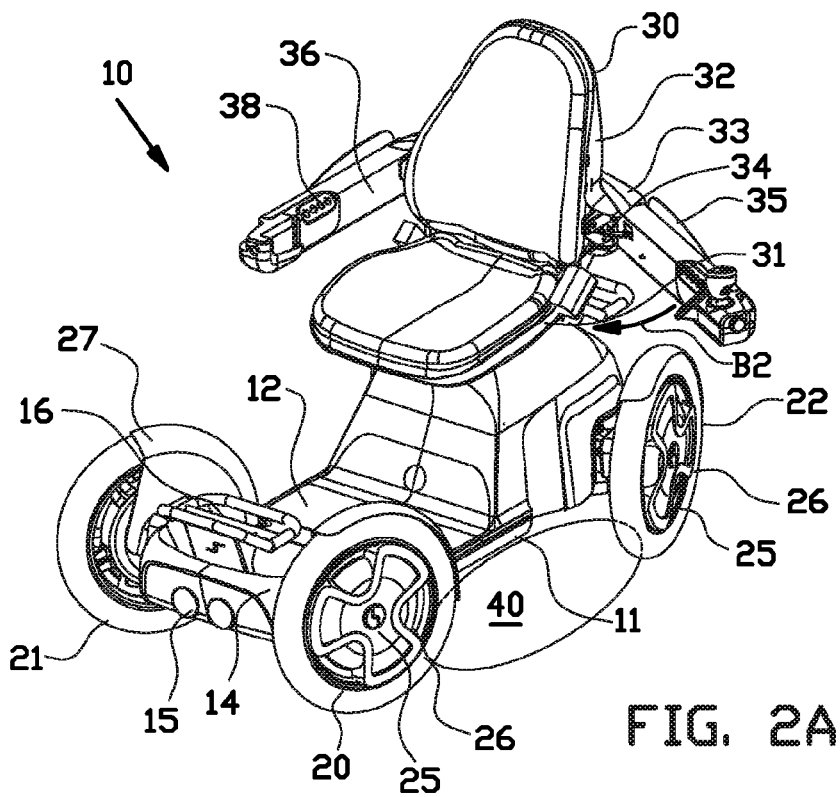
FIGS. 2A and 2B show the mobility scooter according to FIGS. 1A and 1B in a first boarding mode.
Figure 2B:
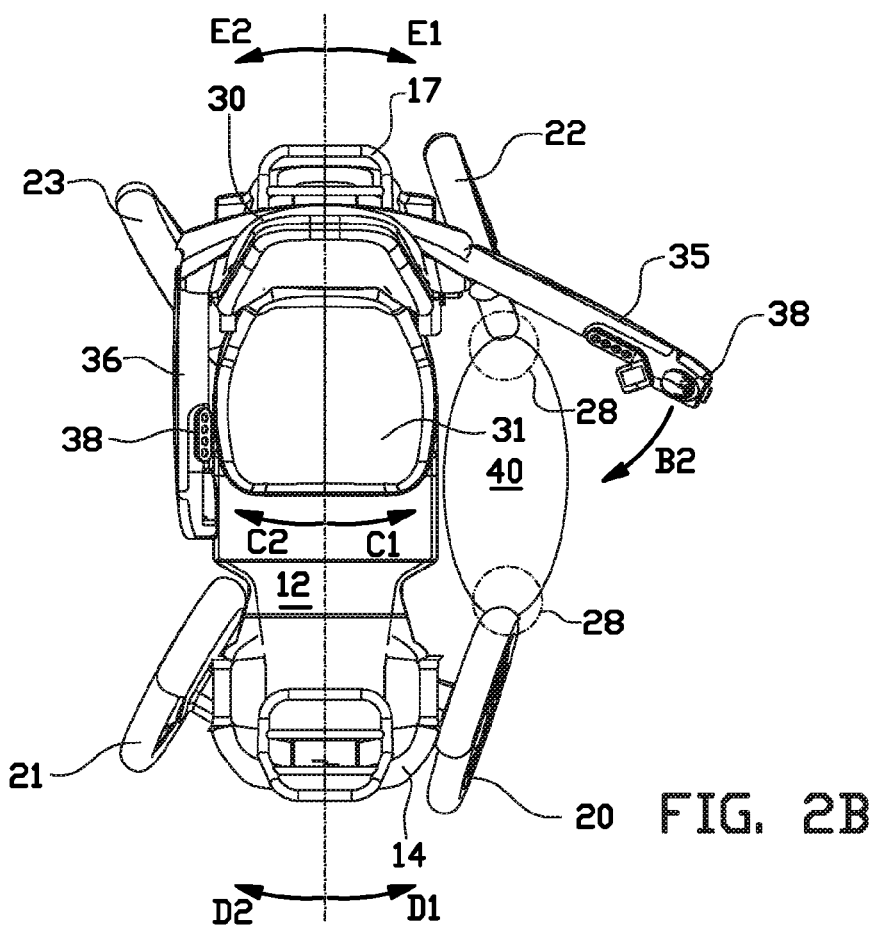

The mobility scooter 10 is provided with a left front wheel 20 and a right front wheel 21 that can synchronously steer in left direction D1 and right direction D2 as shown in FIG. 2B by means of a non-shown electrically powered front steering mechanism inside the steering housing 14, and a left rear wheel 22 and a right rear wheel 23 that in this example can also steer synchronously in left direction E1 and right direction E2 by means of a non-shown electrically powered rear steering mechanism below the battery housing 13. All wheels 20-23 are provided with an air tube 26 and are partly covered by a fender 27. In this example both steering mechanisms are configured to steer the connected wheels 20-23 according to the Ackermann geometry. In addition thereto, the wheels 20-23 may be steered individually. In this example all wheels 20-23 are provided with an electric wheel hub motor 25. As shown in FIGS. 1B, 2B and 3B, the front wheels 20, 21 at least partly overlap with the footrest 12 as seen in the forward driving direction A. Alternatively defined, in the horizontal projection perpendicular to the forward driving direction A, the front wheels 20, 21 at least partly overlap with the footrest 12.

The mobility scooter 10 comprises a seat 30 for the person 1. The seat 30 comprises a seat base 31, a backrest 32, and a left armrest 35 and a right armrest 36 having manually operated controllers 38 for the mobility scooter 10, such as a joystick, which is in this example mounted to the left armrest 35. The armrests 35, 36 are connected to a support 33 on the backrest 32 via hinges 34. As best shown in FIGS. 1A-2B, these hinges 34 allow the armrests 35, 36 to swing in direction B1 to an outspread boarding position and back in direction B2 to a forwardly directed driving position wherein the armrests 35, 36 extend substantially parallel to each other. In this example the armrests 35, 36 swing in the directions B1, B2 in a substantially horizontal plane. The hinges 34 may be electrically powered to drive the swinging movement. The hinges 34 are provided with a first position sensor that registers the boarding position and the driving position.

Figure 3A:
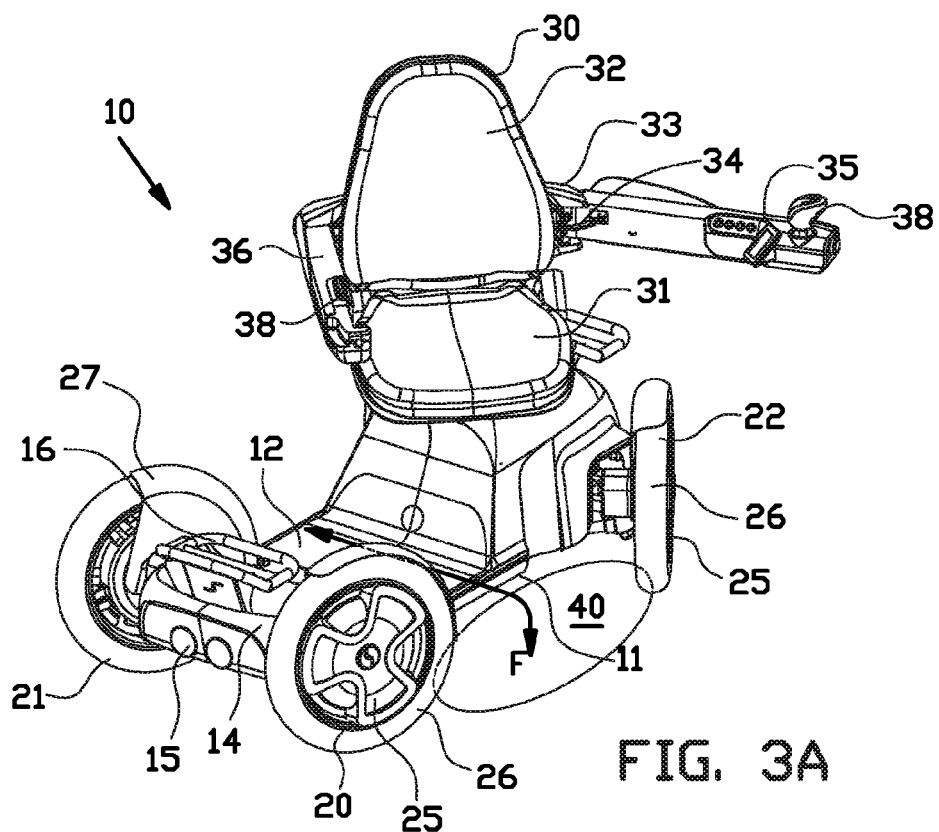
FIGS. 3A and 3B show the mobility scooter according to FIGS. 1A and 1B in a second boarding mode.
Figure 3B:
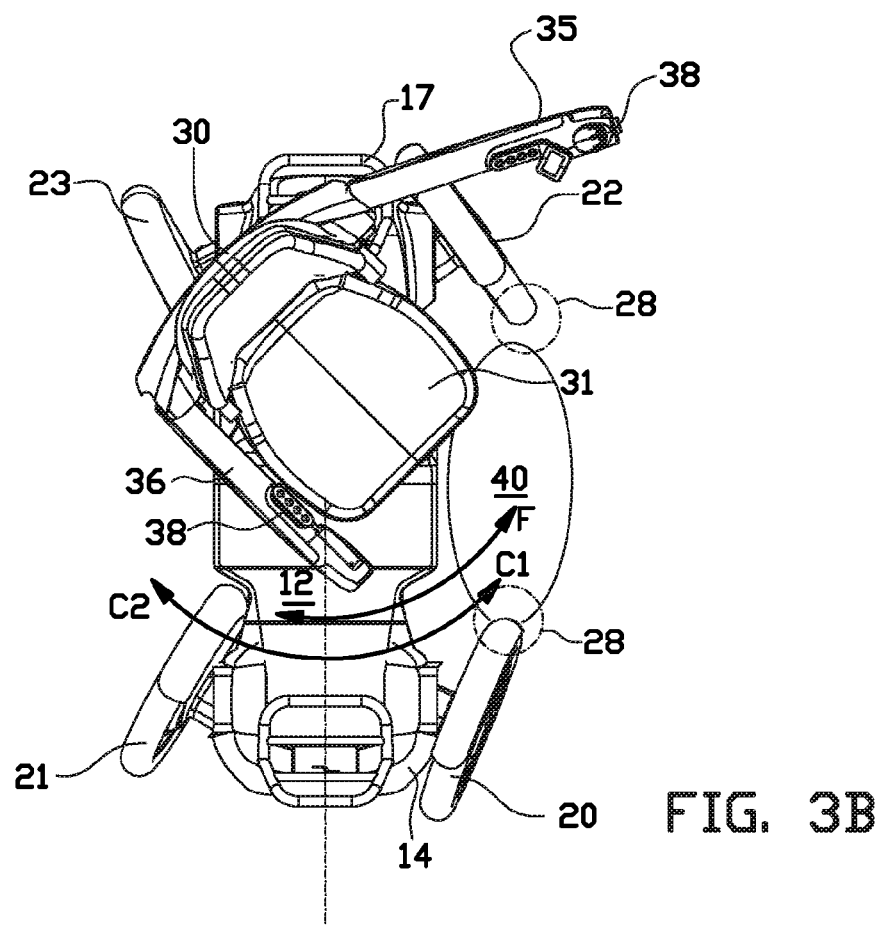

As shown in FIGS. 3A and 3B, the entire seat 30 is rotatable mounted at the seat base 31 to the chassis 11 to swing the seat base 31 around a vertical axis in direction C1 in an oblique boarding position and back in direction C2 in a straight driving position. The rotation may be electrically powered. The mobility scooter 10 is provided with a second position sensor that registers the boarding position and the driving position.

The mobility scooter 10 comprises a non-shown electronic controller assembly, for example below the battery housing 13, that is connected with the manually operated controllers 38, the batteries inside the battery housing 13, the wheel hub motors 25, the steering mechanisms, the first position sensors and the second position sensor. The electronic controller assembly is configured to drive and control the electric components of the mobility scooter 10 in response to the manipulation of the manually operated controllers 38 by the person 1 or in response to the signals of the position sensors.

In the driving mode of the mobility scooter 10 as shown in FIGS. 1A and 1B, the manually operated controllers 38 are manipulated by the person 1 to drive it in its forward driving direction A as shown in FIGS. 1A and 1B, or incidentally reverse, while controlling the steering mechanisms to steer the wheels 20-23 to the left, or to the right as shown as such in FIGS. 2A and 2B. In this example the front wheels 20, 21 steer synchronously opposite to the rear wheels 22, 23 according to the Ackerman geometry.

In the boarding modes of the mobility scooter 10 as shown in FIGS. 2A-3B, the wheels 20-23 are not driven and may even be braked. FIGS. 2A and 2B show a first boarding mode. When the person 1 intends to board or un-board, he swings out one of the armrests 35, 36, in the shown example the left armrest 35, in direction B1 to its outspread boarding position, which is registered by the first position sensor. In response thereto, the electronic controller assembly powers the steering mechanisms to steer the front wheels 20, 21 and the rear wheels 22, 23 in directions D2, E2 into the outermost right driving direction, whereby the facing extreme parts 28 of the left wheels 20, 22 that are adjacent to the footrest 12 move away from the chassis 11 to enlarge the access area 40 on the ground that is adjacent to the chassis 10 near the footrest 12. This first boarding mode as shown in FIGS. 2A and 2B facilitates an easy stepping in or out of the mobility scooter 10 as the person 1 can swing its feet 3 horizontally in direction F along and aside the footrest 12 to or from the ground at the access area 40.

FIGS. 3A and 3B show a second boarding mode of the mobility scooter 10. In this second boarding mode, the person 1 has initiated a swung of the seat base 31 in direction C1 to the left, which is registered by the second position sensor. In response thereto, the electronic controller assembly powers the steering mechanisms to steer the front wheels 20, 21 and the rear wheels 22, 23 in directions D2, E2 into the outermost right driving direction to facilitate the easy stepping in or out as described before.

In abovementioned examples, the person 1 initiates the first boarding mode and second boarding mode by swinging one of the armrests 35, 36 or the entire the seat 30. The boarding modes may also be initiated in other ways, for example via the manually operated controllers 38 or by remote control, wherein in response thereto the electronic controller assembly steers the front wheels 20, 21 and the rear wheels 22, 23 to the left as described before.

In abovementioned examples, both the front wheels 20, 21 and the rear wheels 22, 23 are steered in the boarding modes. Alternatively, only the front wheels 20, 21 may be steered.

In abovementioned examples, the wheels 20-23 are steered via the manually operated controllers 38. Alternatively, the wheels 20-23 are steered by means of a steer in front of the seat 30, wherein in the boarding modes the wheels 20-23 are steered into their outermost sideways steering direction by powering steering mechanisms that act only to change into the boarding mode.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A mobility scooter for individual mobility of a person, comprising a chassis, two front wheels aside the chassis and at least one rear wheel that are rotatable connected with the chassis and of which at least the front wheels are steered with respect to the chassis by means of a powered front steering mechanism, a seat for the person on the chassis, and a footrest on the chassis that extends in the forward driving direction between the seat and the front wheels, wherein the seat comprises a seat base, a backrest and two armrests, wherein at least one of the group of the at least one of the armrests and the seat base has a driving position and a boarding position, wherein the at least one of the armrests is hingeable with respect to the backrest to swing between an arm supporting position in its driving position and an outspread position in its boarding position, and wherein the seat base is rotatable with respect to the chassis around a vertical axis to swing between a forward position in its driving position and an oblique position in its boarding position, wherein the mobility scooter comprises an electronic controller assembly that is configured to drive the rotation of the wheels and to power at least the front steering mechanism, wherein the mobility scooter has a driving mode and a boarding mode, wherein in the driving mode the seat base and the armrests are in their driving position, and wherein in the boarding mode at least one of the group of the seat base and the at least one of the armrests is in its boarding position, wherein the electronic controller assembly is configured to steer the front wheels in the boarding mode into the sideward steering direction that is opposite to the side to which the seat base or the armrest is swung in its boarding position.

2. A mobility scooter according to claim 1, comprising a first position sensor to register the boarding position of the armrest, wherein the first position sensor is connected with the electronic controller assembly and wherein the electronic controller assembly is configured to steer the front wheels into the sideward steering direction that is opposite to the side to which the armrest is swung in response to the registration of the movement of the armrest towards its boarding position.

3. A mobility scooter according to claim 1, comprising a second position sensor to register the boarding position of the seat base, wherein the second position sensor is connected with the electronic controller assembly and wherein the electronic controller assembly is configured to steer the front wheels into the sideward steering direction that is opposite to the side to which the seat base is swung in response to the registration of the movement of the seat base towards its boarding position.

4. A mobility scooter according to claim 1, comprising two rear wheels aside the chassis, wherein the rear wheels are steered with respect to the chassis by means of a powered rear steering mechanism, wherein the electronic controller assembly is configured to drive both the front steering mechanism and the rear steering mechanism, and wherein the electronic controller assembly is configured to steer the front wheels and the rear wheels in the boarding mode into the sideward steering direction that is opposite to the side to which the seat base or the armrest is in the boarding position.

5. A mobility scooter according to claim 1, wherein in the forward driving direction the front wheels at least partly overlap with the footrest.

6. A mobility scooter according to claim 5, wherein the chassis comprises a recess at the overlap to receive a part of one of the front wheel when it is in its sideward steering position.

7. A mobility scooter according to claim 1, wherein the electronic controller assembly is configured to steer the wheels in the boarding mode into the outermost sideward steering position.

8. A mobility scooter according to claim 1, comprising an electric wheel hub motor in at least one of the wheels.

9. A mobility scooter according to claim 1, comprising batteries for electric powering the driving of the mobility scooter.

10. A mobility scooter according to claim 1, comprising a manually operated controller, such as a joystick, for manually driving the mobility scooter by the person, wherein the manually operated controller is connected with the electronic controller assembly, and wherein the electronic controller assembly is configured to power the front steering mechanism in response to the manipulations of the manually operated controller.

* * * * *